Sept. 15, 1959   P. E. PODUFAL   2,904,338
ARROW TIP
Filed June 30, 1958

INVENTOR.
Peter E. Podufal
BY
His Attorneys

United States Patent Office 2,904,338
Patented Sept. 15, 1959

2,904,338

ARROW TIP

Peter E. Podufal, Cheswick, Pa., assignor to Universal Lubricating Systems, Inc., Oakmont, Pa., a corporation of Pennsylvania Application June 30, 1958, Serial No. 745,478

4 Claims. (Cl. 273—106.5)

This invention relates to arrow tips and particularly barbed tips for arrows used in fishing and hunting. A problem exists in the removal of barbed tipped arrows from the fish or game, and also in the economical manufacture of barbed arrow tips. For purposes of explanation and illustration the invention will be described as embodied in a barbed fishing arrow tip.

It is necessary to use barbed arrow tips in fishing in order to retrieve the fish as otherwise when the arrow which has pierced the fish is drawn in by reeling in the fishing line it may remove itself from the fish, resulting in loss of the fish. However, it is difficult to remove a barbed arrow tip from a fish without tearing the fish. I have devised a barbed arrow tip which may be removed from a fish without tearing the fish. At the same time my barbed arrow tip is of low cost and economical to manufacture. I provide for removably attaching the barb to the arrow tip so that when the fish is retrieved the arrow tip may be forced completely through the fish in the direction in which it first entered whereupon the barb may be removed and the shaft of the arrow drawn back out of the fish. This obviates tearing of the fish which would occur if the barb were pulled back out along with the shaft of the arrow. I preferably form the tip of three parts, a body, a point and a barb, assembled in a novel yet simple manner facilitating removal of the barb. I also make provision for preventing the barb from turning and thus insuring its maintaining proper orientation with respect to the remainder of the tip and the arrow as a whole.

I provide an arrow tip comprising a body, a point and a barb, the body and point having cooperating means for removably connecting them together, the barb having a portion adapted to extend into the assembly of body and point and being held in place with respect thereto by connection together of the body and point by said cooperating means. At least one of the body and point preferably has a slot therein for receiving a portion of the barb so that the barb with a portion within the slot is held in place with respect to the body and point by connection together of the body and point by the aforementioned cooperating means.

One of the body and point of my arrow tip preferably has a socket portion and the other a plug portion adapted to enter the socket portion, the plug portion having therein a slot receiving a portion of the barb, the barb being held in place with respect to the body and point by insertion of the plug portion into the socket portion. The socket portion is preferably internally threaded and the plug portion is preferably externally threaded and adapted to be threaded into the socket portion.

The barb preferably has a portion extending somewhat longitudinally of the slot in the plug portion of the arrow tip preventing turning of the barb. Desirably the barb is of generally W shape with the central part thereof in the slot.

Other details, objects and advantages of the invention will become apparent as the following description of a present preferred embodiment thereof proceeds.

In the accompanying drawings I have shown a present preferred embodiment of the invention in which.

Figure 1:
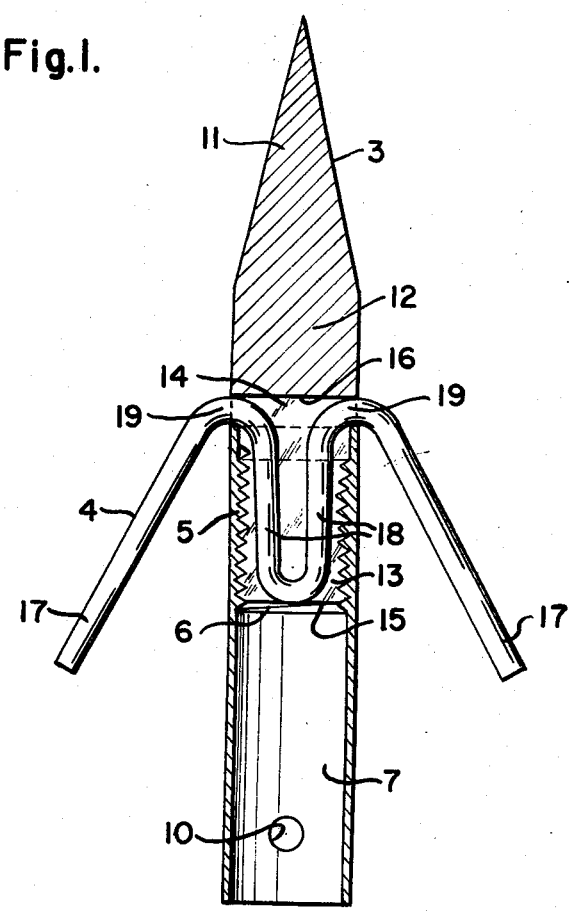
Figure 1 is an axial cross-sectional view through a barbed arrow tip.
Figure 2:
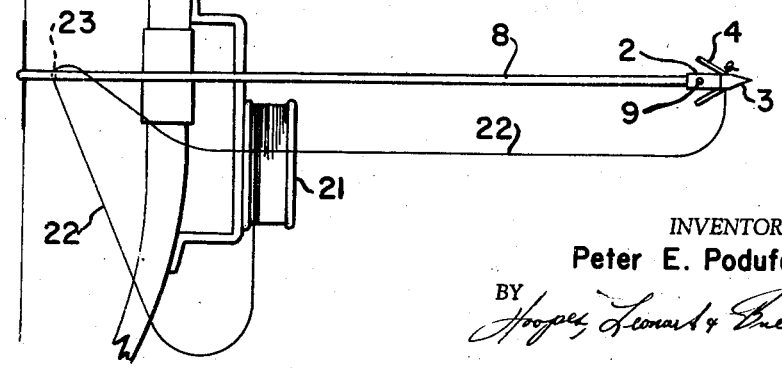
Figure 2 is a view to reduced scale and with a portion cut away showing a fishing bow with a reel attached and an arrow fitted to the bow.

Referring now more particularly to Figure 1, the arrow arrow tip shown therein comprises a body 2, a point 3 and a barb 4. The body 2 is in the shape of a hollow cylinder. At its forward end it is internally threaded as shown at 5 to provide an internally threaded socket 6. At its rearward end it has a smooth bored shaft receiving socket 7 adapted to receive the forward end of an arrow shaft 8 as shown in Figure 2, the body 2 being secured to the shaft 8 by a pin 9 extending through aligned holes 10 in the body 2 and through the material of the shaft, which may be of wood, metal or other suitable material. The arrow tip may be made of any suitable material, metal being preferred.

The point 3 of the arrow tip has a conical extremity 11, a cylindrical central portion 12 and a reduced externally threaded plug portion 13 which is adapted to thread into the internally threaded socket 6 of the body 2. A slot 14 is formed in the plug portion 13 of the point 3, the slot extending diametrically completely through the plug portion and extending all the way from the bottom 15 of the plug portion to the zone marked 16 in Figure 1. The slot is preferably formed by sawing and is of a width such as to receive the barb 4 as will presently be described. The slot lies generally in the plane of the paper upon which Figures 1 and 2 are drawn.

The barb 4 is of generally W shape as shown in Figure 1, having outwardly inclined outer legs or prong portions 17 merging into a generally U-shaped central portion 18 as clearly shown in Figure 1. The barb is preferably made of wire. While the barb 4 shown in Figure 1 is formed of a length of wire cut off square at its ends the extremities of the legs or prongs 17 of the barb may be sharpened or pointed if desired. The central generally U-shaped portion 18 of the barb extends somewhat longitudinally of the slot 14 as shown and prevents turning of the barb.

The arrow tip is assembled by inserting the central portion of the barb into the slot 14 of the point 3 and then screwing on the body 2 as shown in Figure 1. When the body 2 is screwed home on the point 3 the portions 19 of the barb where the central portion 18 joins the prong portions 17 are in juxtaposition to the end surface of the body 2 as shown in Figure 1 and are gripped between the poriton of the point 3 at the extremity of the slot and the end of the body 2. Thus when the body is screwed tight onto the point with the barb in place as shown in Figure 1 there is produced in effect a unitary barbed arrow tip.

Figure 2 shows a fishing bow 20 having a reel 21 mounted thereon and a line 22 extending from the reel through a bore 23 in the rearward portion of the arrow shaft 8. The forward end of the line 22 is preferably gripped along with the barb 4 between the body 2 and the point 3 of the tip. When the arrow is made ready for fishing the point 3 may be turned out of the socket 6 far enough so that the end of the line can be inserted through the slot 14 adjacent the portions 19 of the barb 4 and when the body 2 is thereafter tightened onto the point 3 the end of the line will be tightly secured to the arrow tip.

In fishing the arrow tip may pass through the fish or it may only penetrate the fish at one side. Unless the tip has passed completely through the fish it is forced through so that the fish is impaled only on the cylindrical portion of the shaft 8. Thereupon the point 3 is unscrewed and the barb 4 is removed and the shaft with the body 2 of the arrow tip is withdrawn through the fish, avoiding tearing of the fish by withdrawing the barb through it. Then the barb and point may again be applied to the arrow along with the end of the line and the arrow is ready for reuse.

While I have shown and described a present preferred embodiment of the invention it is to be distinctly understood that the invention is not limited thereto but may be otherwise variously embodied within the scope of the following claims.

I claim:

1. An arrow tip comprising a body, a point and a barb, the body and point having cooperating portions having means for readily engaging and disengaging the body and point whereby the body and point are assemblable and disassemblable, the barb having a portion disposed within the assembled body and point when the body and point are connected together and having a projecting portion extending out of the assembly of the body and point and a portion to which the projecting portion is connected disposed in juxtaposition to an end surface of one thereof and clamped between the body and point, whereby the barb is held in place with respect to the body and point upon assembly and connecting together of the body and point and is removable and separable from the body and point when the body and point are disassembled.

2. An arrow tip comprising a body, a point and a barb, one of the body and point having a recess and the other thereof having a projection adapted to enter the recess, said projection and recess having means for readily engaging and disengaging the body and point whereby the body and point are assemblable and disassemblable, the barb having a portion disposed within the assembled body and point when the body and point are connected together and having a projecting portion extending out of the assembly of the body and point and a portion to which the projecting portion is connected disposed in juxtaposition to an end surface of the one of the body and point having the recess and clamped between the body and point, whereby the barb is held in place with respect to the body and point upon assembly and connecting together of the body and point and is removable and separable from the body and point when the body and point are disassembled.

3. An arrow tip comprising a body, a point and a barb, one of the body and point having an internally threaded socket portion and the other thereof having an externally threaded plug portion adapted to be threaded into the socket portion for readily engaging and disengaging the body and point whereby the body and point are assemblable and disassemblable, the barb having a portion disposed within the assembled body and point when the body and point are connected together and having a projecting portion extending out of the assembly of the body and point and a portion to which the projecting portion is connected disposed in juxtaposition to an end surface of the one of the body and point having the internally threaded socket portion and clamped between the body and point, whereby the barb is held in place with respect to the body and point upon assembly and connecting together of the body and point and is removable and separable from the body and point when the body and point are disassembled.

4. An arrow tip comprising a body, a point and a barb, one of the body and point having a recess and the other thereof having a projection adapted to enter the recess, said projection and recess having means for readily engaging and disengaging the body and point whereby the body and point are assemblable and disassemblable, the projection having a barb-receiving slot, the barb having a portion disposed within the assembled body and point and within the barb-receiving slot when the body and point are connected together and having a projecting portion extending out of the assembly of the body and point and a portion to which the projecting portion is connected disposed in juxtaposition to an end surface of the one of the body and point having the recess and clamped between the body and point, whereby the barb is held in place with respect to the body and point upon assembly and connecting together of the body and point and is removable and separable from the body and point when the body and point are disassembled.

References Cited in the file of this patent

UNITED STATES PATENTS

| 2,725,656 | Schmidt | Dec. 6, 1955 |
| 2,753,643 | Recker | July 10, 1956 |
| 2,806,317 | Minisini | Sept. 17, 1957 |